(12) United States Patent
Chen et al.

(10) Patent No.: US 11,571,647 B2
(45) Date of Patent: Feb. 7, 2023

(54) GEL-SEALED AIR SUPPLY BOX

(71) Applicant: Suzhou Guoli Clean Technology Co., Ltd., Jiangsu (CN)

(72) Inventors: Yun Chen, Suzhou (CN); Shuixing Li, Suzhou (CN)

(73) Assignee: SUZHOU GUOLI CLEAN TECHNOLOGY CO., LTD., Suzhou (CN)

( * ) Notice: Subject to any disclaimer, the term of this patent is extended or adjusted under 35 U.S.C. 154(b) by 357 days.

(21) Appl. No.: 16/875,022

(22) Filed: May 15, 2020

(65) Prior Publication Data

US 2021/0354070 A1    Nov. 18, 2021

(51) Int. Cl.
*B01D 46/00* (2022.01)
*B01D 46/10* (2006.01)
*B01D 46/42* (2006.01)

(52) U.S. Cl.
CPC ......... *B01D 46/10* (2013.01); *B01D 46/0005* (2013.01); *B01D 46/0041* (2013.01); *B01D 46/4227* (2013.01)

(58) Field of Classification Search
CPC .... B01D 46/00; B01D 46/10; B01D 46/0005; B01D 46/0041; B01D 46/0057–0083
USPC ......... 55/385.1, 410.1, 418.1, 467.1; 165/95, 165/303, DIG. 11, DIG. 85, DIG. 10; 62/303, 104.34
See application file for complete search history.

(56) References Cited

U.S. PATENT DOCUMENTS

| | | | | |
|---|---|---|---|---|
| 5,417,610 | A * | 5/1995 | Spransy | F24F 3/167 55/385.2 |
| 8,529,653 | B2 * | 9/2013 | Sakashita | F24F 13/28 55/385.2 |
| 8,734,553 | B2 * | 5/2014 | Sakashita | F24F 13/20 55/296 |
| 2002/0134061 | A1 * | 9/2002 | McGill | E04B 9/02 55/385.2 |
| 2005/0076625 | A1 * | 4/2005 | Mahan | F02M 35/024 55/486 |
| 2008/0086994 | A1 * | 4/2008 | Descotes | F24F 1/005 55/471 |
| 2010/0077923 | A1 * | 4/2010 | Lewis | B01D 46/62 55/354 |

* cited by examiner

*Primary Examiner* — Minh Chau T Pham (57) ABSTRACT

A gel-sealed air supply box includes an air inlet and a box body, wherein the box body is internally provided with a filter. A plurality of filter profiles that are sequentially connected are arranged on the inner side surfaces of the box body, and a corner dust generating pipe is arranged between two filter profiles. A dust distributing pipe is arranged at the top end of the filter profile, and the dust distributing pipe is communicated with the corner dust generating pipe. A plurality of dust holes are formed in the top end of the dust distributing pipe. According to the disclosure, dust can be uniformly generated and a more precise detection result can be achieved.

4 Claims, 8 Drawing Sheets

GEL-SEALED AIR SUPPLY BOX

TECHNICAL FIELD

This disclosure generally relates to the technical field of air supply boxes, and more particularly, to a gel-sealed air supply box.

BACKGROUND

Gel-sealed air supply boxes typically include an air inlet and a box body, wherein the box body is internally provided with a filter. Air is first introduced into the box body from the air inlet and then to a house after being filtered by the filter. A dust generator for generating dust may be arranged above the filter in the box body. The filtering effect may be detected by measuring the dust concentration in the box body and the dust concentration after filtration in air below the filter. The dust generator typically includes a dust-generating pipe, which may generate non-uniform dust and cause low accuracy of the detected data. Further, the filter typically has a size smaller than that of the interior of the box body for replacement purposes, which may lead to difficulties in aligning the filter with the center of the box body. As a result, the filter cannot be centrally mounted, and the position offset is unavoidable.

SUMMARY

The purpose of the present disclosure is to provide a gel-sealed air supply box. According to the disclosure, dust can be uniformly generated through a dust generating device and a more precise detection result can be achieved.

To achieve the above purpose, the present disclosure adopts the following technical solution:

A gel-sealed air supply box comprising an air inlet and a box body, wherein the box body is internally provided with a filter; a plurality of filter profiles that are sequentially connected are arranged on inner side surfaces of the box body, wherein a corner dust generating pipe is arranged between two filter profiles of the plurality of filter profiles; a dust distributing pipe is arranged at a top end of the plurality of filter profiles, and the dust distributing pipe is communicated with the corner dust generating pipe; a plurality of dust holes are formed in atop end of the dust distributing pipe.

In another aspect of the disclosure, a corner detecting pipe is arranged between the two filter profiles. The corner detecting pipe and the corner dust generating pipe are symmetrically arranged about a center of the box body, and both the corner detecting pipe and the corner dust generating pipe extend to a bottom end of the box body.

In another aspect of the disclosure, the dust distributing pipe extends from the top end of the plurality of filter profiles to the center of the box body, and a top end of the corner dust generating pipe and a top end of the corner detecting pipe extend from the top end of the plurality of filter profiles to the center of the box body. A bottom end of the plurality of filter profiles is provided with a lower protruding edge which extends to the center of the box body. Edges of upper surfaces of the filter are provided with upper sealing rings and edges of lower surfaces of the filter are provided with lower sealing rings, and the upper and lower sealing rings are respectively in contact with the dust distributing pipe and the lower protruding edge.

In another aspect of the disclosure, upper corners of the corner dust generating pipe and the corner detecting pipe are respectively provided with a triangular positioning block, and the triangular positioning blocks abut against corners of the filter.

In another aspect of the disclosure, side surfaces of the corner dust generating pipe and the corner detecting pipe are provided with positioning pieces. Positioning slots are formed in both the dust distributing pipe and the lower protruding edge, and the positioning pieces are fixedly inserted into the positioning slots.

In another aspect of the disclosure, a locking groove is formed in the bottom end of the box body, and a positioning strip is arranged in the box body. The top end of the plurality of filter profiles abuts against a lower portion of the positioning strip. A supporting block is inserted into the locking groove, and the plurality of filter profiles are supported by the supporting block.

Compared with the prior art, the technical solution of the disclosure achieves the following technical effects:

Through the dust distributing pipe arranged to be communicated with the corner dust generating pipe and the reasonable arrangement of airflow, dust can be uniformly generated and the dust concentration can be precisely measured. Both the corner dust generating pipe and the corner detecting pipe are provided with triangular positioning blocks, and the top corners of the filter abut against the triangular positioning blocks during assembly, which enables the filter to move toward the center of the box body so that it can be mounted centrally. Through the combination with the sealing rings, the joint between the filter and the box body to be fully sealed.

MARKING INSTRUCTIONS OF THE DRAWINGS

1—Air Inlet, 2—Box Body, 21—Positioning Strip, 211—Cutting Opening, 27—Locking Groove, 3—Filtering Screen, 5—Lifting Lug, 6—Filter, 7—Supporting Block, 8—Filter Profile, 81—Dust Distributing Pipe, 811—Dust Hole, 82—Lower Protruding Edge, 801—Positioning Slot, 9—Corner Detecting Pipe, 91—Triangular Positioning Block, 10—Corner Dust Generating Pipe, 101—Positioning Piece.

DETAILED DESCRIPTION

Embodiments of the gel-sealed air supply box of this disclosure are described hereafter with reference to FIGS. 1-9.

In the description of the disclosure, it should be noted that terms for indicating orientation and positional relationships such as "central", "lateral (X)", "longitudinal (Y)", "vertical (Z)", "length", "width", "thickness", "upper", "lower", "front", "rear", "left", "right", "vertical", "horizontal", "top", "bottom", "inner", "outer", "clockwise" and "counterclockwise" are based on the orientation or positional relationships shown in the Figures, which are merely used for conveniently describing the disclosure and simplifying the description rather than indicating or implying that the device or element referred to must have a specific direction, be constructed and operated in a specific direction. Therefore, the aforesaid terms cannot be understood as the limitation to the scope of the disclosure.

In addition, the terms such as "first" and "second" are merely used for the purpose of description, which cannot be understood as an indication or implication of relative importance or an implication of the number of technical features. Thus, a technical feature defined by "first" or "second" can explicitly or implicitly includes one or more of the technical features. In the description of the disclosure, unless it is specifically defined, the terms "a plurality of" and "several" mean two or more.

The gel-sealed air supply box of this disclosure comprises an air inlet 1 and a box body 2, wherein the box body 2 is internally provided with a filter 6. A plurality of filter profiles 8 that are sequentially connected are arranged on the inner side surfaces of the box body 2, wherein a corner dust generating pipe 10 is arranged between two filter profiles 8. A dust distributing pipe 81 is arranged at the top end of the filter profile 8, and the dust distributing pipe 81 is communicated with the corner dust generating pipe 10. A plurality of dust holes 811 are formed in the top end of the dust distributing pipe 81.

During the detection, dust is generated in the box body 2 through the corner dust generating pipe 10, and is uniformly distributed within the box body 2 through the corner dust generating pipe 10, the dust distributing pipe 81 and the dust holes 811. According to the aforesaid design, when detecting the air filtered by the filter 6, the detection result can be more reliable, and the filtering effect of the filter 6 can be truly reflected.

Figure 1:
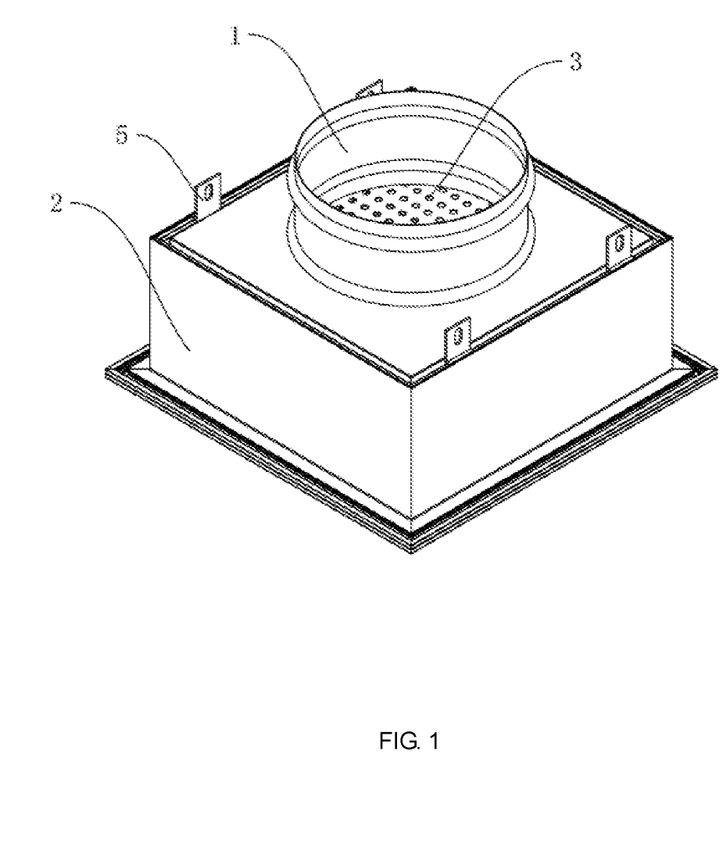
FIG. 1 is a three-dimensional diagram illustrating an example structure of a gel-sealed air supply box of the present disclosure.
Figure 2:
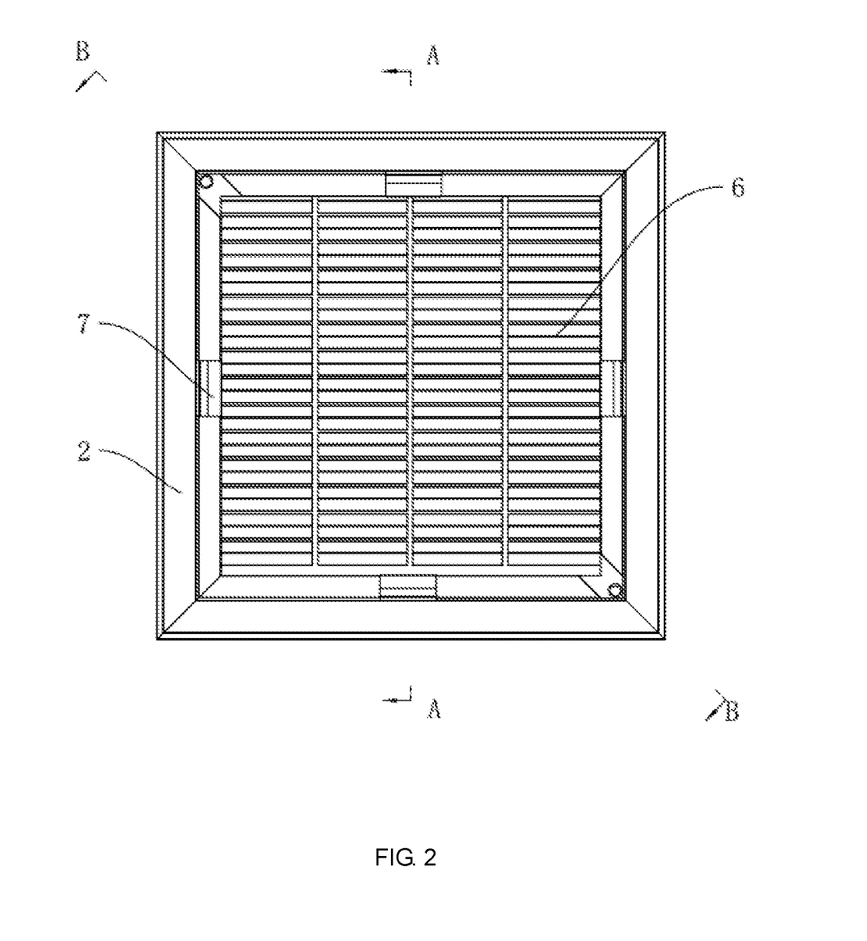
FIG. 2 is a schematic and conceptual diagram illustrating a bottom view of an example structure of a gel-sealed air supply box of the present disclosure.
Figure 3:
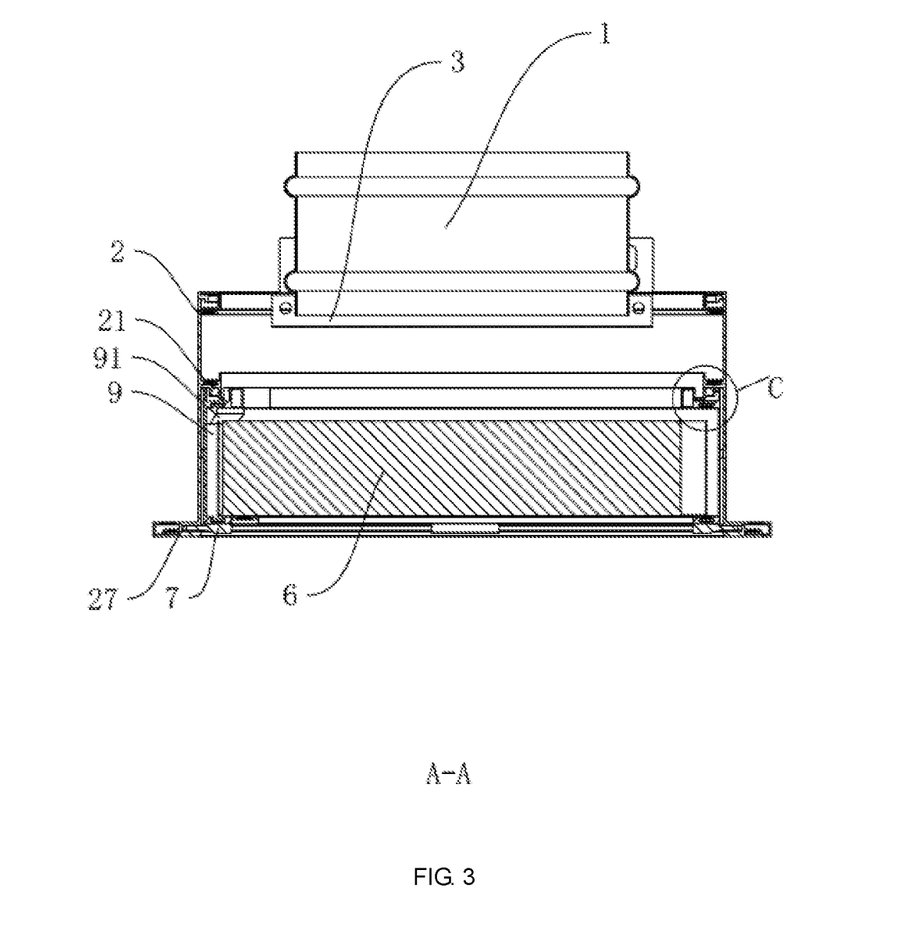
FIG. 3 is a sectional view of the gel-sealed air supply box of FIG. 2, taken along line A-A in FIG. 2.

As shown in FIG. 1, a filtering screen 3 is arranged at the junction of the air inlet 1 and the box body 2 for preliminarily filtering large-particle substances, and lifting lugs 5 are arranged at the edges of the box body 2.

In this embodiment, the filter profile 8 can be directly fixed to the interior of the box body 2, or can be removably mounted within the box body 2 as described hereinafter.

In this embodiment, a corner detecting pipe 9 is preferably arranged between two filter profiles 8. The corner detecting pipe 9 and the corner dust generating pipe 10 are symmetrically arranged about the center of the box body 2, and both the corner detecting pipe 9 and the corner dust generating pipe 10 extend to the bottom end of the box body 2.

Figure 4:
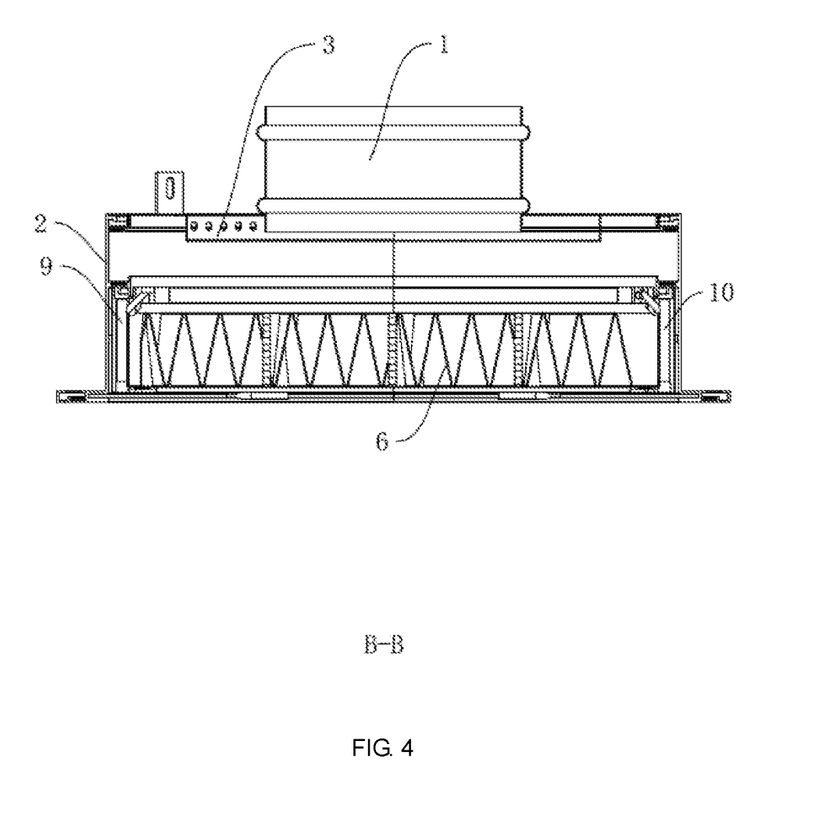
FIG. 4 is a sectional view of the gel-sealed air supply box of FIG. 2, taken along line B-B in FIG. 2.

As shown in FIG. 4, the corner dust generating pipe 10 is used for generating dust in the box body 2, and the Di Octyle Phthalate (DOP) detection is performed through the corner detecting pipe 9, which makes the detection more convenient and accurate.

Preferably, in this embodiment, the dust distributing pipe 81 extends from the top end of the filter profile 8 to the center of the box body 2, and the top ends of the corner dust generating pipe 10 and the corner detecting pipe 9 extend from the top end of the filter profile 8 to the center of the box body 2. The bottom end of the filter profile 8 is provided with a lower protruding edge 82 which extends to the center of the box body 2. The edges of the upper and lower surfaces of the filter 6 are respectively provided with a sealing ring, and the upper and lower sealing rings are respectively in contact with the dust distributing pipe 81 and the lower protruding edge 82.

The upper and lower surfaces of the filter 6 are confined between the dust distributing pipe 81 and the lower protruding edge 82. According to this design, the sealing rings arranged on the filter 6 interact with the filter profiles, thereby achieving an ideal sealing effect.

Preferably, in this embodiment, a locking groove 27 is formed in the bottom end of the box body 2, and a positioning strip 21 is arranged in the box body 2. The top end of the filter profile 8 abuts against the lower portion of the positioning strip 21. A supporting block 7 is inserted into the locking groove 27, and the filter profile 8 is supported by the supporting block 7.

Figure 9:
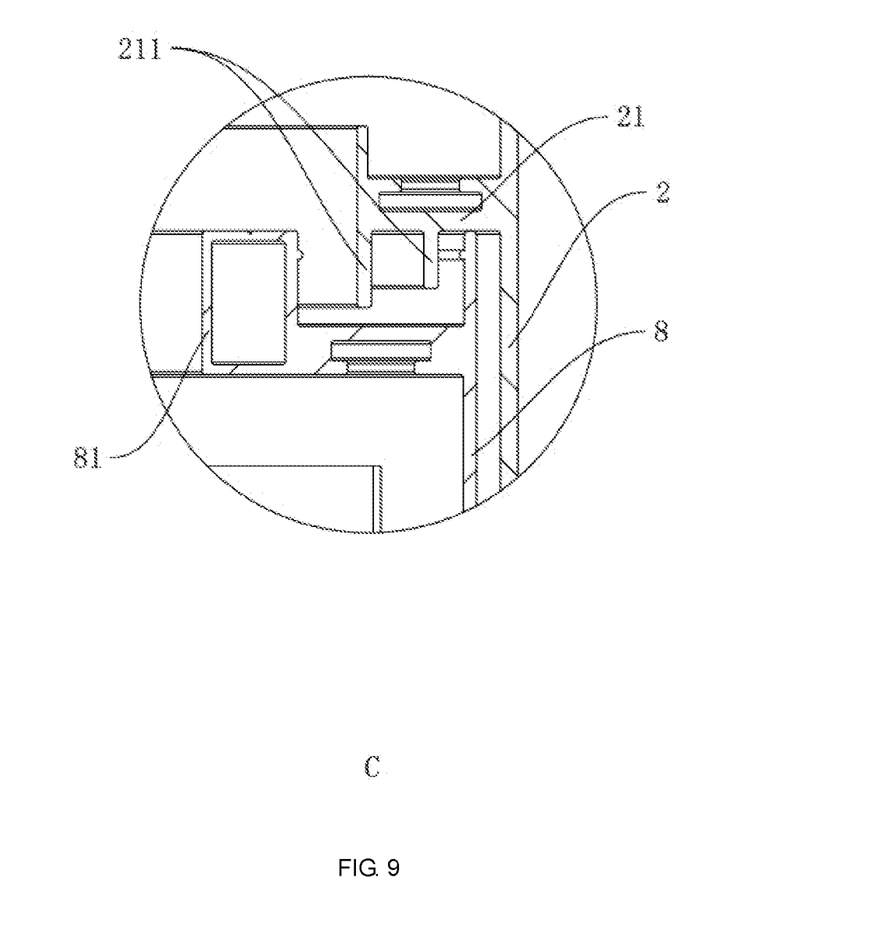
FIG. 9 is an enlarged view of portion C in FIG. 3.

As shown in FIG. 9, preferably, the lower portion of the positioning strip 21 is provided with two cutting openings 211, and the top of the filter profile 8 is first provided with a foaming sealing ring and then coated with gel. During installation, the filter profile 8 goes upward to be in contact with the cutting openings 211. At this point, the cutting openings 211 are in full contact with the gel, achieving an ideal sealing effect.

When the filter 6 is cuboid-shaped, there are four filter profiles 8. The four filter profiles 8 are respectively placed on four sides of the filter 6, and the corner dust generating pipe 10 and the corner detecting pipe 9 are subsequently placed at corresponding positions. In this way, the filter 6, the filter profiles 8, the corner detecting pipe 9 and the corner dust generating pipe 10 can form an integral body. The integral body is placed into the box body 2 from the bottom of the box body 2 until the gel provided on the top of the filter profile 8 is in contact with the cutting openings 211 in the positioning strip 21. Thus, the positioning strip 21 and the filter profile 8 form a fully sealed state. Subsequently, through inserting the supporting block 7 into the locking groove 27, the integral body can be supported. According to the aforesaid, convenient assembly and disassembly can be achieved. During production, various parts can be produced and on-site assembled, making the production simple and convenient.

In this embodiment, the side surfaces of the corner dust generating pipe 10 and the corner detecting pipe 9 are preferably provided with positioning pieces 101, positioning slots 801 are formed in both the dust distributing pipe 81 and the lower protruding edge 82, and the positioning pieces 101 are fixedly inserted into the positioning slots 801.

As shown in FIGS. 5, 6, 7 and 8, the corner dust generating pipe 10 and the corner detecting pipe 9 are respectively provided with four positioning pieces 101, wherein two of them are arranged at the upper portion for interacting with the dust distributing pipe 81, and the other two are arranged at the lower portion for interacting with the lower protruding edge 82. When assembling the corner dust generating pipe 10, the corner detecting pipe 9 and the filter profiles 8, the positioning pieces 101 are respectively inserted into the positioning slots 801 of the dust distributing pipe 81 and the lower protruding edge 82, which achieves a convenient assembly. The assembly gaps can be sealed by using polyurethane AB glue. The performance of AB glue is far higher than that of the traditional glass glue, and the latter is easy to age. Certainly, other assembly gaps in the box body 2 (gaps between the box body 2 and the air inlet 1) are also sealed by using AB glue. After the box body 2 is used for a prolonged period, the bonding effect and strength are still high, and the box body 2 can be protected from aging quickly.

In this embodiment, preferably, the upper corners of the corner dust generating pipe 10 and the corner detecting pipe 9 are respectively provided with a triangular positioning block 91, and the triangular positioning blocks 91 abut against the corners of the filter 6.

Figure 5:
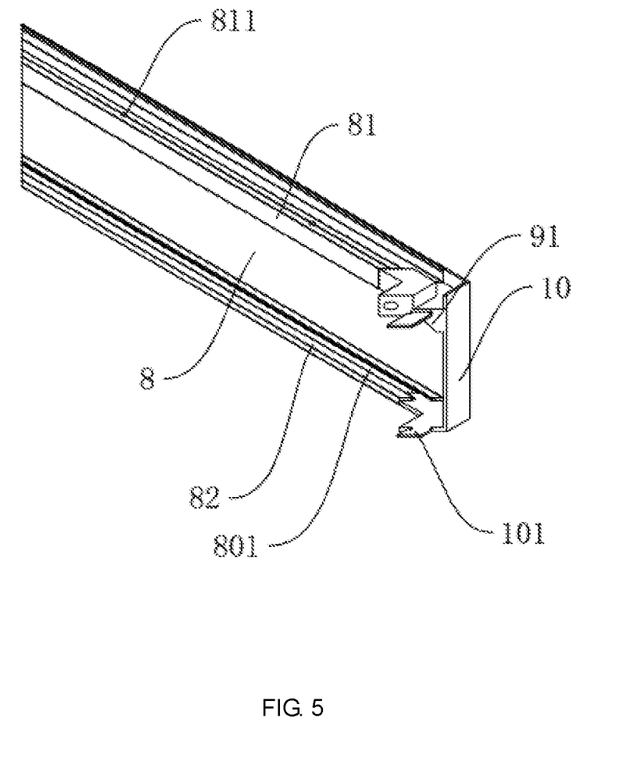
FIG. 5 is a three-dimensional diagram illustrating an example structure when the corner dust generating pipe and a filter profile of the disclosure are assembled.
Figure 6:
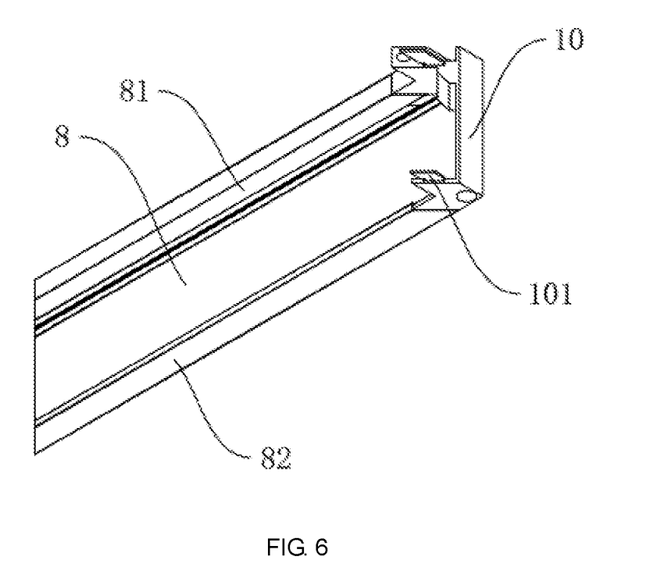
FIG. 6 is another three-dimensional diagram illustrating an example structure a gel-sealed air supply box, where a corner dust generating pipe and a filter profile are assembled.
Figure 7:
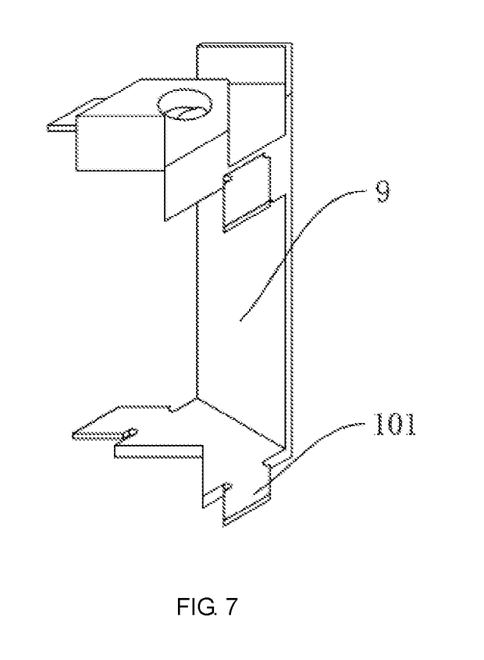
FIG. 7 is a three-dimensional diagram illustrating an example structure of a corner detecting pipe of the present disclosure.
Figure 8:
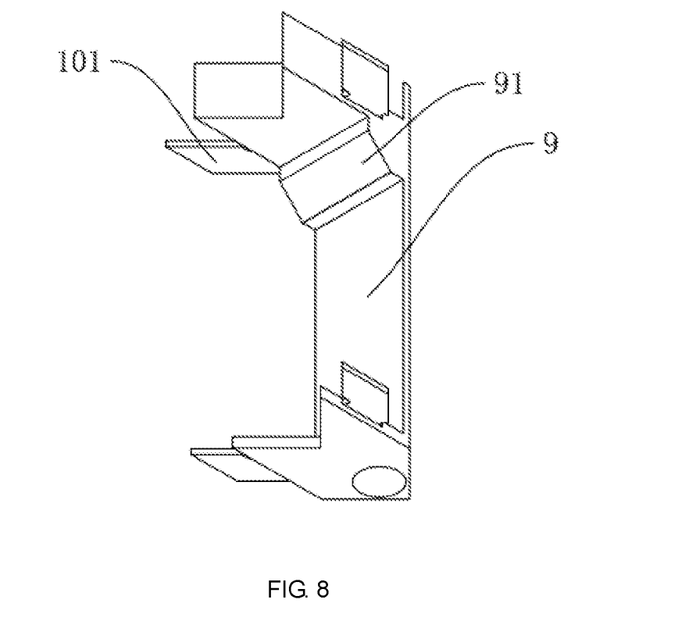
FIG. 8 is another three-dimensional diagram illustrating an example structure of a corner detecting pipe of the present disclosure.

As shown in FIGS. 4, 5 and 6, the inclined face of the triangular positioning block 91 is inclined toward the interior of the box body 2, namely, when the filter 6 is assembled, the corners of the top end of the filter 6 are in contact with the triangular positioning blocks 91, and along with the process of squeezing the triangular positioning blocks 91, the filter 6 moves toward the center of the box body 2. Thus, the filter 6 can be mounted centrally.

The above are merely preferred embodiments of the disclosure, and the scope of the disclosure is not limited to the embodiments described above. All technical solutions obtained without paying creative labor shall fall into the scope of the disclosure. It should be noted that modifications and variations made by those skilled in the art without departing from the spirit and principles of the disclosure shall fall into the scope of the disclosure.

What is claimed is:

1. A gel-sealed air supply box, comprising:
an air inlet and a box body, wherein the box body is internally provided with a filter, wherein a plurality of filter profiles that are sequentially connected are arranged on inner side surfaces of the box body, wherein a corner dust generating pipe is arranged between two of the plurality of the filter profiles, wherein a dust distributing pipe is arranged at a top end of each of the plurality of the filter profiles, and the dust distributing pipe is communicated with the corner dust generating pipe, wherein a plurality of dust holes are formed in top end of the dust distributing pipe;
a corner detecting pipe arranged between the two of the plurality of the filter profiles, wherein the corner detecting pipe and the corner dust generating pipe are symmetrically arranged about a center of the box body, and both the corner detecting pipe and the corner dust generating pipe extend to a bottom end of the box body; and
the dust distributing pipe extends from the top end of each of the plurality of the filter profiles to the center of the box body, and top ends of the corner dust generating pipe and the corner detecting pipe extend from the top end of each of the plurality of the filter profiles to the center of the box body, wherein a bottom end of each of the plurality of the filter profiles is provided with a lower protruding edge which extends to the center of the box body, wherein edges of upper and lower surfaces of the plurality of the filter profiles are respectively provided with upper sealing rings and lower sealing rings, and the upper sealing rings and the lower sealing rings are respectively in contact with the dust distributing pipe and the lower protruding edge.

2. The gel-sealed air supply box of claim 1, wherein upper corners of the corner dust generating pipe and the corner detecting pipe are respectively provided with triangular positioning blocks, and the triangular positioning blocks abut against corners of the plurality of the filter profiles.

3. The gel-sealed air supply box of claim 2, wherein side surfaces of the corner dust generating pipe and the corner detecting pipe are provided with positioning pieces, wherein positioning slots are formed in both the dust distributing pipe and the lower protruding edge, and the positioning pieces are fixedly inserted into the positioning slots.

4. The gel-sealed air supply box of claim 3, wherein a locking groove is formed in the bottom end of the box body, and a positioning strip is arranged in the box body, wherein the top end of each of the plurality of the filter profiles abuts against a lower portion of the positioning strip, wherein a supporting block is inserted into the locking groove, and the plurality of the filter profiles is supported by the supporting block.

\* \* \* \* \*